United States Patent
McBrearty (10) Patent No.: US 11,119,801 B2
(45) Date of Patent: Sep. 14, 2021

(54) MIGRATING VIRTUAL MACHINES ACROSS COMMONLY CONNECTED STORAGE PROVIDERS

(71) Applicant: International Business Machines Corporation, Armonk, NY (US)

(72) Inventor: Gerald McBrearty, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 16/368,114

(22) Filed: Mar. 28, 2019

(65) Prior Publication Data
US 2020/0310854 A1 Oct. 1, 2020

(51) Int. Cl.
*G06F 9/455* (2018.01)
*G06F 3/06* (2006.01)

(52) U.S. Cl.
CPC .......... *G06F 9/45558* (2013.01); *G06F 3/067* (2013.01); *G06F 3/0619* (2013.01); *G06F 3/0647* (2013.01); *G06F 3/0664* (2013.01); G06F 2009/4557 (2013.01); G06F 2009/45595 (2013.01)

(58) Field of Classification Search
CPC .. G06F 9/45558; G06F 3/0647; G06F 3/0664; G06F 3/067; G06F 2009/4557; G06F 2009/45595
See application file for complete search history.

(56) References Cited

U.S. PATENT DOCUMENTS

| 8,555,278 B2 | 10/2013 | Janakiraman |
| 10,002,014 B2 | 6/2018 | Matzek et al. |
| 2011/0179415 A1* | 7/2011 | Donnellan .......... G06F 9/45558 718/1 |
| 2012/0102291 A1 | 4/2012 | Cherian et al. |

(Continued)

FOREIGN PATENT DOCUMENTS

| TW | I579770 B | 4/2017 |
| WO | 2017068770 A1 | 4/2017 |

OTHER PUBLICATIONS

Anonymous. (2015). Method and apparatus to connect multiple FC hosts to centralized storage without a FC SAN fabric. IPCOM000240291D.

(Continued)

*Primary Examiner* — Benjamin C Wu
(74) *Attorney, Agent, or Firm* — Patterson + Sheridan, LLP (57) ABSTRACT

Method and system for deploying a virtual machine or attaching a storage volume to a virtual machine (VM). A process obtains information regarding fabrics attached to hosts and storage devices attached to the fabrics and determines whether a VM can be deployed to a host or whether storage volumes can be attached to a VM. In one case, determining that a fabric attached to a host can support a virtual SCSI volume causes migrating a VM to the host and attaching the virtual SCSI volume to the migrated VM. In another case, determining that the fabric attached to a host can support an NPIV volume causes migrating the VM to the (Continued)

host and attaching the NPIV volume to a virtual channel mapped to the fabric attached to the host. If the VM cannot be migrated, then the user is given an indication that the attachment is not possible.

18 Claims, 6 Drawing Sheets

(56)    References Cited

U.S. PATENT DOCUMENTS

| | | | | |
|---|---|---|---|---|
| 2013/0117806 | A1* | 5/2013 | Parthasarathy | G06F 21/53 726/1 |
| 2014/0156813 | A1* | 6/2014 | Zheng | H04L 67/34 709/220 |
| 2015/0052517 | A1* | 2/2015 | Raghu | H04L 12/4641 718/1 |
| 2015/0052523 | A1* | 2/2015 | Raghu | G06F 9/45558 718/1 |
| 2015/0268935 | A1* | 9/2015 | Muntes | G06F 8/70 717/105 |
| 2015/0331635 | A1* | 11/2015 | Ben-Shaul | G06F 3/061 711/120 |
| 2015/0350021 | A1* | 12/2015 | Morris | H04L 67/10 709/224 |
| 2017/0010908 | A1* | 1/2017 | Matzek | G06F 3/065 |
| 2017/0012903 | A1* | 1/2017 | Matzek | G06F 9/5011 |
| 2017/0012904 | A1* | 1/2017 | Matzek | H04L 67/1002 |
| 2017/0139729 | A1* | 5/2017 | Cropper | G06F 9/45558 |
| 2017/0269958 | A1 | 9/2017 | Narasimhamurthy et al. | |
| 2017/0286523 | A1* | 10/2017 | Lee | H04L 67/10 |
| 2017/0366606 | A1* | 12/2017 | Ben-Shaul | G06F 3/064 |
| 2018/0307512 | A1* | 10/2018 | Balma | G06F 9/5077 |
| 2019/0188024 | A1* | 6/2019 | Liu | G06F 9/45558 |
| 2019/0265999 | A1* | 8/2019 | Tsirkin | H04L 63/06 |
| 2019/0310790 | A1* | 10/2019 | Allen | G06F 3/0647 |
| 2019/0324786 | A1* | 10/2019 | Ranjan | G06F 9/5077 |
| 2020/0167177 | A1* | 5/2020 | Mahajan | G06F 9/45558 |
| 2020/0195524 | A1* | 6/2020 | Clow | H04L 41/042 |

OTHER PUBLICATIONS

Zang, Q., Cheng, L, & Boutaba, R. (2010). Cloud computing: state-of-the-art and research challenges. Journal of internet services and applications, 1(1), pp. 7-18.

Niranjan Mysore, R., Pamboris, A., Farrington, N. et al. (2009). Portland: a scalable fault-tolerant layer 2 data center network fabric. ACM SIGCOMM Computer Communication Review, 39(4), pp. 39-50.

* cited by examiner

MIGRATING VIRTUAL MACHINES ACROSS COMMONLY CONNECTED STORAGE PROVIDERS

BACKGROUND

The present invention relates to deploying virtual resources, and more specifically, to deploying virtual machines and attaching storage volumes to virtual machines.

A storage connectivity group (SCG) is a logical grouping of resources that can be used to connect storage to virtual machines (VMs) along with the rules to specify how to make the connection. The SCG is associated with sets of fabrics to which physical storage is attached and a set of virtual I/O servers (VIOS), each of which provides IO services to a VM. The sets of fabrics and set of VIOSs are considered storage connectivity candidates for virtual machines during deployment and migration and when new storage is attached to a virtual machine. However, when deploying a VM or attaching a volume to a VM, failure to consider the capabilities of the available fabrics may cause errors in deploying the virtual machine or attaching a volume.

There is a need to improve the ability to deploy virtual machines and to attach new storage to a virtual machine in light of the available fabrics connected to the several host computers so as to avoid errors in deploying the virtual machine or attaching a volume to a virtual machine.

SUMMARY

One embodiment of the present invention includes a method for attaching a storage volume to a virtual machine. The method includes determining from a plurality of storage providers that an attachment of the storage volume to the virtual machine is possible, where each storage provider includes a fabric and a portion of a plurality of storage devices connected to the fabric and the fabric of each storage provider is connected to one or more host computers of a plurality of host computers. The method further includes migrating the virtual machine from a first host computer on which the virtual machine is running to a second host computer to allow the attachment of the storage volume to the virtual machine if migration of the virtual machine is permitted, and attaching the storage volume to the migrated virtual machine.

Other embodiments include a system and a computer program product carrying out one or more aspects of the above method.

One aspect of the embodiments is that it is less likely that an error is encountered when deploying a virtual machine or when attaching a volume to a virtual machine because the properties of fabrics and ports of the fabric are considered in performing the deployment or volume attachment.

DETAILED DESCRIPTION

Figure 1:
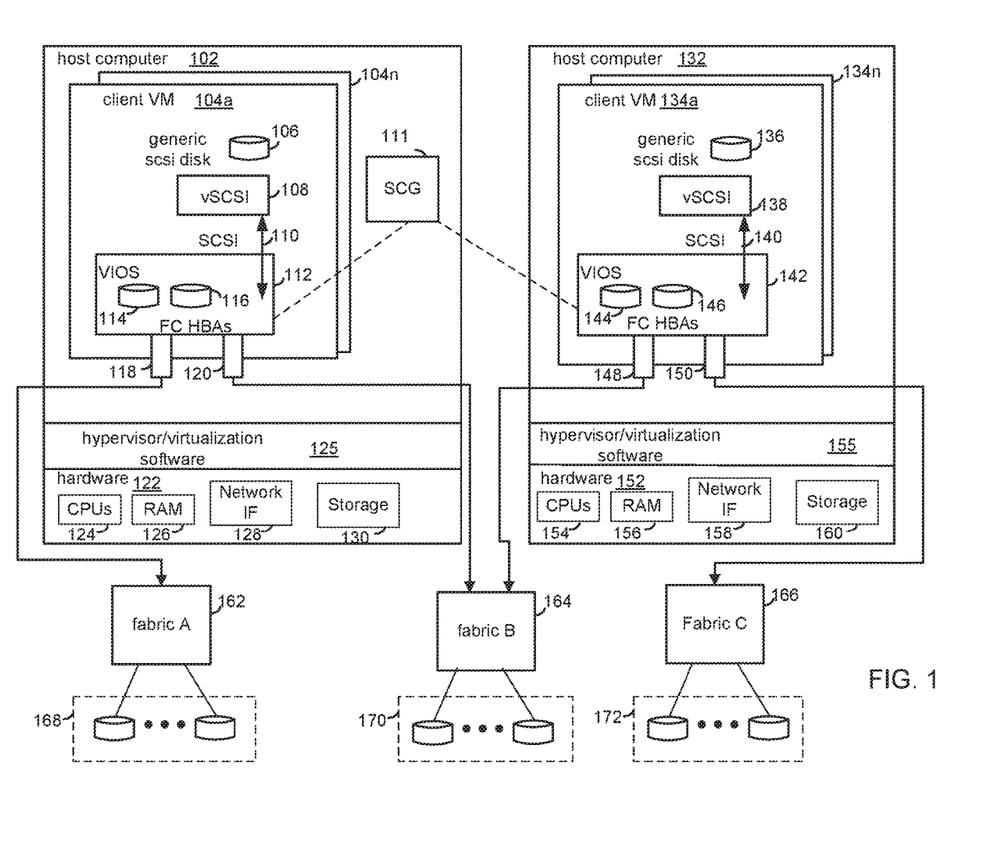
FIG. 1 depicts a block diagram of a system that is representative of an architecture in which embodiments may be implemented.

FIG. 1 depicts a block diagram of a system that is representative of an architecture in which embodiments may be implemented. The architecture includes one or more host computers including a first host computer 102 and a second host computer 132. The first host computer 102 includes hardware 122, hypervisor/virtualization software 125 and one or more client virtual machines (VM) 104a-n. The hardware 122 includes one or more CPUs 124, RAM 126, a network interface 128 and a host storage 130, such as one or more persistent storage devices. The RAM 126 stores programs in the form of instructions executed by the one or more CPUs 124, which programs may be stored on host storage 130 and loaded into RAM 126 from host storage 130. Each client VM 104a-n includes a generic virtual SCSI disk 106 and a virtual Small Computer System Interface (vSCSI) 108. The vSCSI disk 106 is coupled to a Virtual IO Server (VIOS) 112 via a SCSI channel 110 and includes one or more generic SCSI Logical Unit Numbers (LUNs) 114, 116 and one or more host bus adapters (HBA) 118, 120, where a generic SCSI LUN is an allocation of block storage from a pool of block storage available to the VIOS. The VIOS 112 provides virtualization of SCSI devices 114, 116 to the client VM 104 and acts as the SCSI target.

In the figure, the first host computer 102 includes Storage Connectivity Group (SCG) 111, which is associated with sets of Fibre Channel fabrics such as fabrics A 162, B 164, and C 166 and ports of those fabrics and a set of VIOSs, such as VIOS 112 and VIOS 142, each of which controls storage traffic and storage connectivity for one or more virtual machines 104a-104n, 134a-134n. The SCG 111 is used to orchestrate traffic among the various VIOSs, fabrics, and ports of each fabric with which it is associated. Such orchestration can include isolating traffic for certain workloads to specific VIOSs, fabrics, and ports of each fabric and specifying redundancy of VIOSs, fabrics and host ports of each fabric in the manner that volumes are attached to virtual machines. Each SCG is assumed to be storage ready, which means that the VIOSs are running and one or more associated physical ports in each fabric are ready and able to support either NPIV connectivity or vSCSI connectivity.

The second host computer 132 has a similar configuration and includes hardware 152, hypervisor/virtualization software 155 and client VMs 134a-n. The hardware 152 includes one or more CPUs 154, RAM 156, a network interface 158, and host storage 160, such as one or more persistent storage devices. The RAM 156 contains programs in the form of instructions which are executed by the one or more CPUs 154 and which are stored on storage 160 and loaded into RAM 156 from storage 160. Each client VM 134a-n includes a generic virtual SCSI disk 136, a vSCSI interface coupled to a VIOS 142 via SCSI channel 140. The VIOS 142 includes generic SCSI Logical Unit Numbers (LUNs) 144, 146, and one or more HBAs 148, 150. VIOS 142 is under the direction of SCG 111 running on host computer 102. Alternatively, the SCG 111 can run on host computer 132 or an SCG can run on each host computer 102, 132 and the SCGs can coordinate their activities.

The HBA 118 is coupled to switched fabric A 162 which is connected to one or more disks or storage arrays 168, where a switched fabric is a network of nodes and switches which permit all nodes to communicate with one another via dedicated paths between nodes. Each node in the fabric has a unique address for communication, and a fabric can be described by the number of tiers it contains, where the number of tiers is the number of switches traversed between two nodes that are farthest from each other. The HBA 120 and HBA 148 are coupled to switched fabric B 164 which connected to one or more disks or storage arrays 170. The HBA 150 is coupled to switched fabric C 166, which is connected to one or more disks or storage arrays 172. In one embodiment, the switched fabrics A, B, and C are Fibre Channel switched fabrics and HBAs 118, 120, 148 and 150 are Fibre Channel HBAs. Fibre Channel fabrics have ports that can be one of four different types, an N_Port, an E_Port, an F_Port, and a G_port. The N_Port is an endpoint in the fabric, also known as a node port, is the type of port to which the HBAs 118, 120, 148, 150 are attached. The other types of ports, E_Port, F_Port, and G_Port, are ports internal to the fabric. In some embodiments, each N_Port in a switched fabric has a port ID, and the fabric supports virtualization of an N_Port ID. This virtualization, called NPIV, allows several virtual machines to share a common physical N_Port with each virtual machine using its own N_Port ID for that physical port node.

A switched fabric, such as a Fibre Channel Switched Fabric, permits the aggregating and sharing of all storage devices connected to the fabric. For example, fabric A 162 permits an HBA coupled to the fabric to aggregate and share all storage devices or arrays 168. Fabric B 164 permits HBA 120 and HBA 148 to aggregate and share all storage devices or arrays 170 and fabric C 166 allows HBA 150 to share all storage devices or arrays 172.

Figure 2:
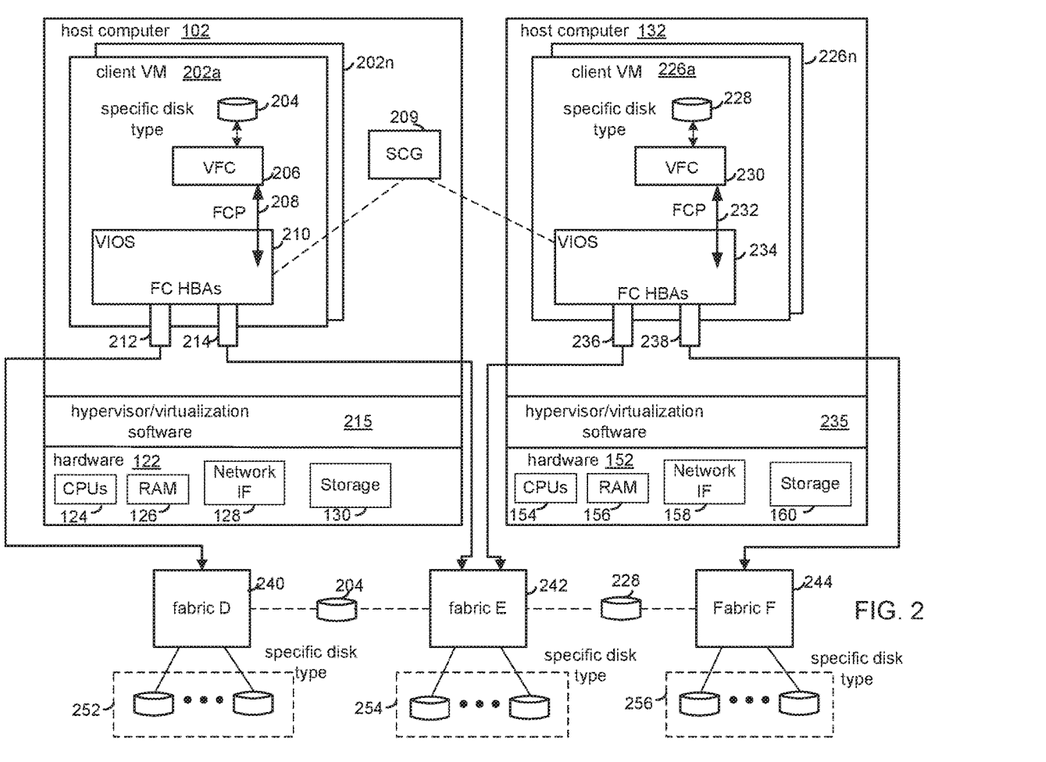
FIG. 2 depicts a block diagram of a system that is representative of an alternative architecture in which embodiments may be implemented.

FIG. 2 depicts a block diagram of a system that is representative of an alternative architecture in which embodiments may be implemented. The architecture includes host computers 102 and 132 with the same hardware 122 and 152 but with different virtualization software 215, 235 and a different configuration of the client VMs 202a-n, 226a-n. In the first host computer 102 of FIG. 2, the client VM 202a is configured to have a specific type of disk 204, such as an IBM 2107, and a Virtual Fibre Channel (VFC) interface 206 to Fibre channel 208 according to a Fibre Channel Protocol (FCP). The Fibre Channel 208 is coupled to the VIOS 210, which includes HBAs 212 and 214. The HBAs 212 and 214 are Fibre Channel HBAs which are respectively coupled to fabric D 240 and fabric E 242, which are Fibre Channel switched fabrics connected respectively to disks or storage arrays 252, 254. With the VIOS 210 operating as a pass-through device, disk 204 appears to the client VM 202a as connected to fabric D 240 and fabric E 242 (represented by the dotted connections to the fabric) and the types of disks or storage arrays 252, 254 attached to fabric D 240 and fabric E 242 match the type of disk 204. The first host computer 102 includes SCG 209 which directs operations of the VIOS 210. Alternatively, SCG 209 can run on host computer 132 or an SGC can run on each host computer 102 and 132 and the SGCs can coordinate their activities.

The second host computer 132 is configured similarly. Client VM 226a includes a specific type of disk 228, such as an IBM 2107, and a VFC interface 230 to Fibre Channel 232. The VIOS 234 operates as a pass-through device and is respectively coupled via HBAs 236 and 238 to fabric E 242 and fabric F 244, which are Fibre Channel switched fabrics. The VIOS 234 is also under the direction of SCG 209 and acts as a pass-through device from disk 228 to the fabrics E 242 and F 244. Disk 228 appears to the client VM 226a as connected to fabric E 242 and fabric F 244 (represented by the dotted connections to the fabric) and the types of disks or storage arrays 254 and 256 attached to fabric E 242 and fabric F 244 match the type of disk 228.

Figure 3:
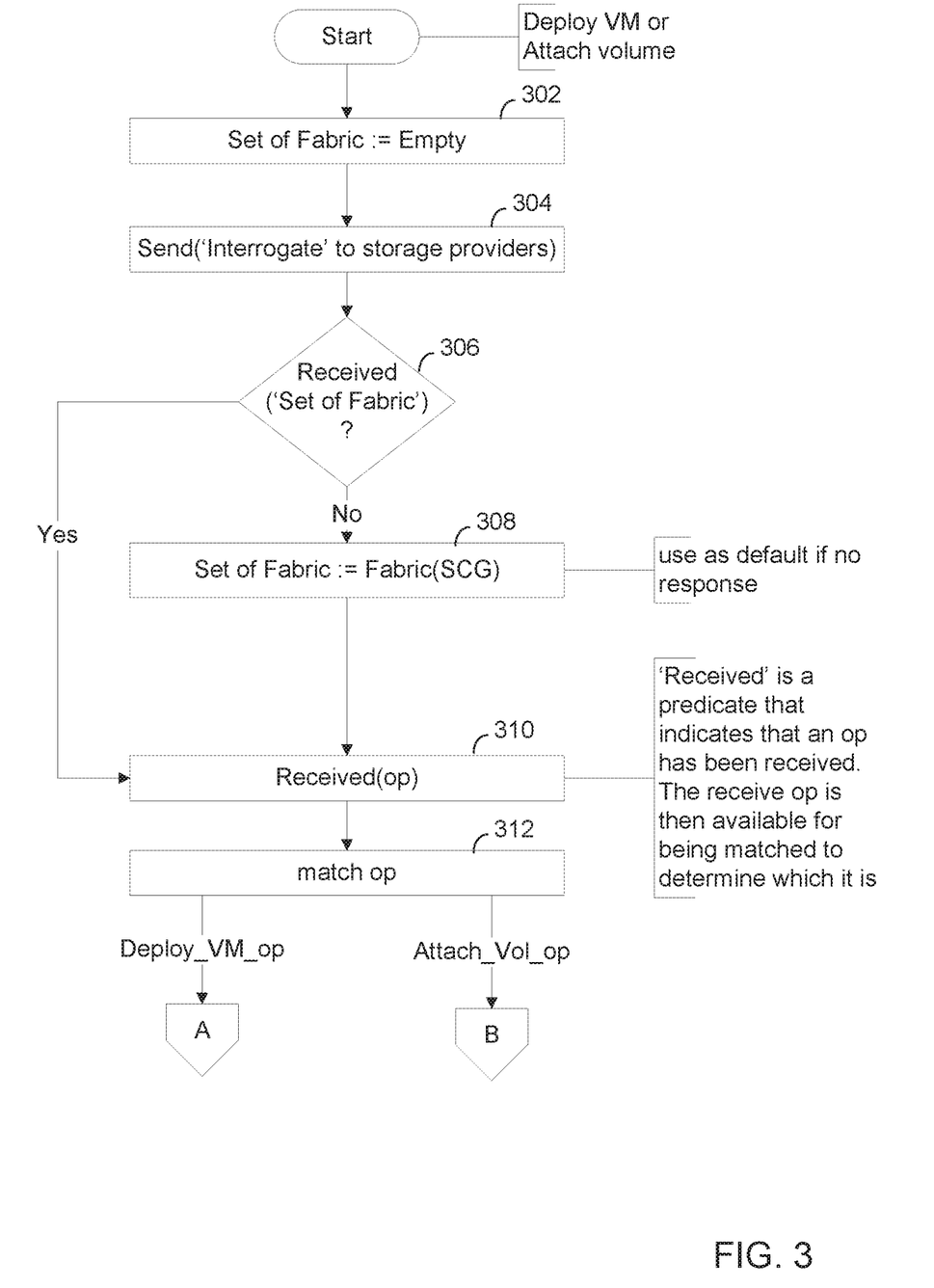
FIG. 3 depicts a flowchart of operations for deploying a virtual machine or attaching a volume to a virtual machine, in an embodiment.

FIG. 3 depicts a flowchart of operations for deploying a virtual machine or attaching a volume to a virtual machine. In step 302, the process, which in one embodiment is SCG 111, initializes a Set of Fabrics to empty. In step 304, the process sends an 'interrogate' request to the storage providers. In step 306, the process determines whether or not a Set of Fabrics has been received from the storage providers. If so, then it uses the received set as the Set of Fabrics. If not, then in step 308, it uses the fabric of the SCG 111, 209 as the value of Set of Fabrics. Thus, the current fabric of the SCG 111, 209 becomes the default Set of Fabrics. In step 310, the process receives an operation, and in step 312 matches the operation to either a deploy virtual machine (VM) operation 'Deploy_VM_op' (A) or an attach volume operation, 'Attach_Vol_op' (B).

Figure 4A:
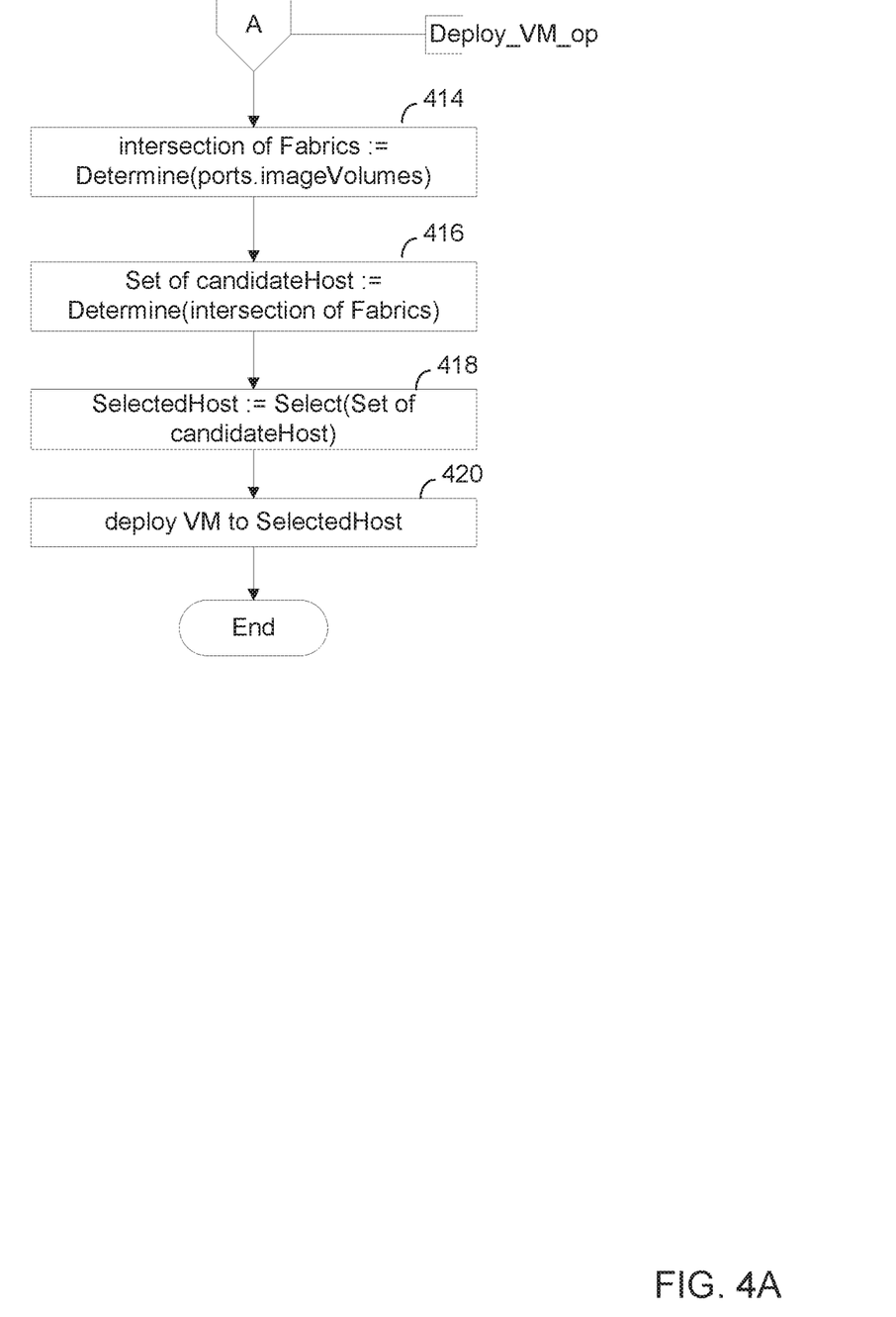
FIG. 4A depicts a flowchart of operations for deploying a virtual machine, in an embodiment.

FIG. 4A depicts a flowchart of operations for deploying a virtual machine. In step 414, the process, which is the SCG 111, 209 in an embodiment, obtains an intersection of fabrics based on the ports of the image volumes provided by the storage provider, where the intersection of fabrics includes those fabrics that are commonly connected to two or more host computers. For example, the intersection of fabrics for the architecture depicted in FIG. 1 is fabric B 164 because it is common to both host computers 102 and 132. In step 416, the process determines a set of candidate host computers to which the VM can be deployed based on the intersection of fabrics. For example, continuing with the architecture of FIG. 1, both host computers 102 132 are candidates if fabric B 164 is the fabric needed by the VM being deployed. In step 418, the process selects one of the candidate host computers 102 132, and in step 420 deploys the VM to the selected host computer.

Figure 4B:
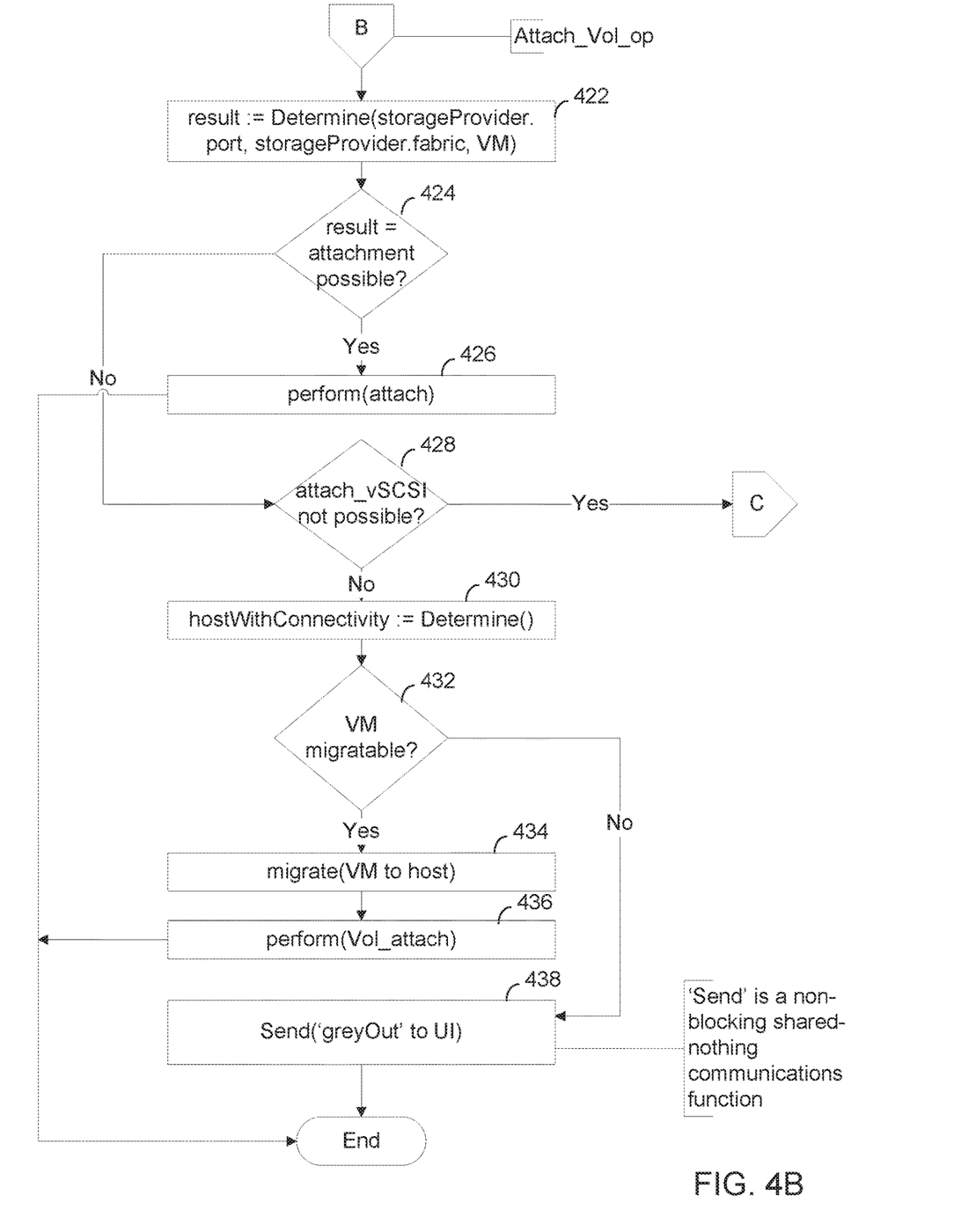
FIG. 4B depicts a flowchart of operations for attaching a volume to a virtual machine, in an embodiment.
Figure 4C:
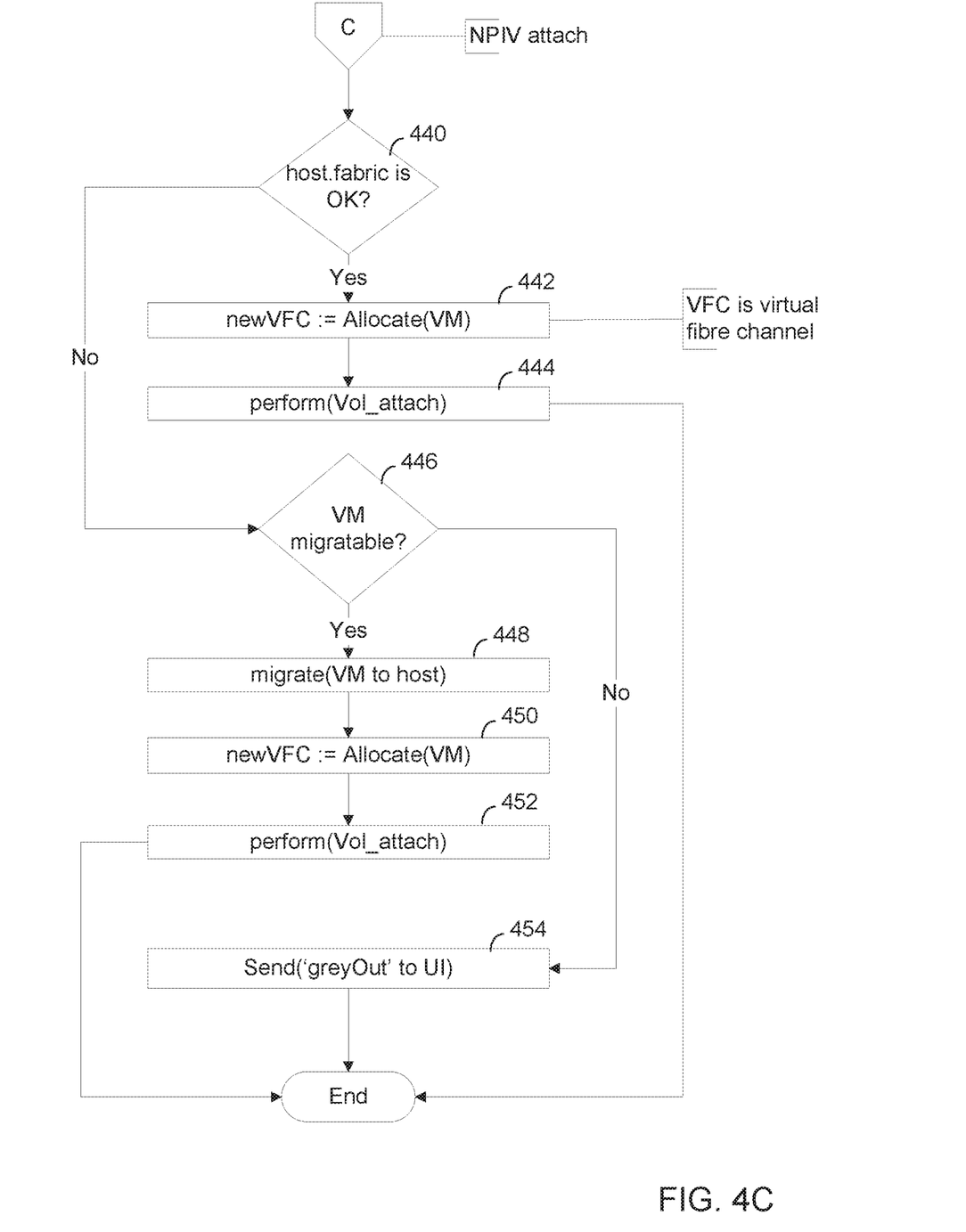
FIG. 4C depicts a flowchart of operations for attaching a volume to a virtual machine, in an embodiment.

FIGS. 4B and 4C depict a flowchart of operations for attaching a volume to a virtual machine. In step 422, the process, which in one embodiment is the SCG 111, determines a result based on the ports of the storage provider, the fabric of the storage provider and the VM to which the volume is to be attached. In step 424, the process uses the result to determine whether the attachment is possible. Attachment is possible if one of the host computer systems and disk or storage array are connected to and logged into a common fabric. When hosts and storage are not logged in to a common fabric then no attachment is possible. If the attachment is possible, the process performs the attachment in step 426. If the attachment is not possible and it is the NPIV attachment that is not possible as determined in step 428, then a vSCSI attachment may be possible, and in step 430, the process determines which host computers have the needed connectivity. For example, for the architecture depicted in FIG. 1, second host computer 132 may be the host computer with the needed connectivity because it is connected to fabric C 166. In step 432, the process determines whether the client VM 104a can be migrated or not. If migration is permitted, then in step 434 the process migrates the client VM 104a to the second host computer 132 which has the needed connectivity. In some embodiments, the migration in step 434 is performed according to the steps 414-420 of FIG. 4A. In step 436, the process performs the vSCSI volume attachment to the migrated client VM. For example, continuing with the example of the architecture in FIG. 1, a client VM 104a from first host computer 102 may be migrated to second host computer 132 because of the storage connected to Fabric C 166. In step 438, if the client VM cannot be migrated, then the process fails and sends a 'greyOut' of a field on a user interface display, where Send('message' to destination) is an asynchronous non-blocking transmission of a 'message' to the 'destination' without being involved in the underlying communications mechanism.

Step 440 of FIG. 4C is executed if a volume is attachable as an NPIV attachment. In step 440, the process determines whether the fabric available to the host computer is 'OK,' meaning acceptable for an NPIV attachment. For example, fabric E 242 in FIG. 2 is a fabric that is acceptable for NPIV attachment. If so, then in step 442, the process allocates a new Virtual Fibre Channel (VFC) for the VM. In step 444, the process then performs an attachment of the volume. Allocating a new VFC includes allocating cables and connectors from those available to the process and mapping a channel to the cables and connectors with the channel conforming to the Fibre Channel protocol. Conforming to the Fibre Channel protocol includes implementing the Fibre Channel protocol stack, Fibre Channel Addressing, World Wide Names, Fibre Channel Frames, the structure and organization of the Fibre Channel data, Fibre Channel Flow Control, and Fibre Channel Service Classes. If the fabric available to the host computer is not acceptable for an NPIV attachment, then in step 446, the process determines whether the VM can be migrated. If so, then in step 448 the process migrates the client VM to the host computer having an acceptable fabric. For example, fabric F 244 in FIG. 2 may be a fabric that is acceptable for NPIV attachment so client VM 202a may be migrated to second host computer 132. In some embodiments, the migration in step 448 is performed according to steps 414-420 of FIG. 4A. In step 450, the process allocates a new VFC for the VM. In step 452, the process then attaches the NPIV volume to the migrated client VM. If migration is not possible, then the process sends, in step 454, the 'greyOut' message to a field on a user interface display to indicate a failure, i.e., that an attachment is not possible.

In some embodiments, attachments of volumes as other than vSCSI or NPIV attachment types is possible. Such other attachment types include Internet Small Computer System Interface (iSCSI), Non-volatile Memory Express over Ethernet (NVMe), and Non-volatile Memory Express over Fibre Channel (NVME-FC).

Thus, by querying the fabric of the storage provider to determine the connectivity it can support and by being able to migrate VMs to hosts having the needed connectivity, deploying VMs or attaching volumes to VMs is substantially more likely not to encounter an error.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, and embodiments are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In the context of the embodiments described herein, an application such as a long-running database application running in a VM may require additional storage space. The embodiments herein allow for a volume from any storage provider to be allocated and attached to the VM regardless of what fabrics the storage is on by determining a host that has connectivity to the storage and automatically migrating the VM to the host that is determined as having connectivity to the new volume and all the existing volumes that the VM requires. Doing so allows a user to use the VM with the additional storage from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for attaching a storage volume to a virtual machine, the method comprising:
   determining from a plurality of storage providers that an attachment of the storage volume to the virtual machine is possible, wherein each storage provider includes a fabric and a portion of a plurality of storage devices connected to the fabric, the fabric of each storage provider being connected to one or more host computers of a plurality of host computers;
   wherein determining that an attachment of the storage volume to the virtual machine is possible comprises interrogating the plurality of storage providers and finding at least one fabric that is connected to both a first host computer and a second host computer in the plurality of host computers;

upon determining that migration of the virtual machine is permitted, migrating the virtual machine from the first host computer on which the virtual machine is running to the second host computer to allow the attachment of the storage volume to the virtual machine; and attaching the storage volume to the migrated virtual machine.

2. The method of claim 1, wherein the fabric of each storage provider includes a plurality of ports; and wherein determining that the attachment of the storage volume to the virtual machine is possible is based on the plurality of ports of each storage provider.

3. The method of claim 1, further comprising, upon determining that migration of the virtual machine is not permitted, sending an indication to a user interface that the storage volume cannot be attached to the virtual machine.

4. The method of claim 1, wherein the storage volume is attachable as a virtual SCSI (vSCSI) volume;

further comprising determining that the second host computer connects to the fabric of one of the plurality of storage providers that can accept the vSCSI volume.

5. The method of claim 1, wherein the storage volume is attachable as a virtualized N_Port ID (NPIV) volume;

further comprising, prior to migrating the virtual machine to the second host computer, determining that the second host computer connects to the fabric of one of the plurality of storage providers that can accept the NPIV volume, and allocating a new virtual channel mapped to the fabric that can accept the NPIV volume; and wherein attaching the storage volume to the second host computer includes attaching the storage volume to the new virtual channel.

6. The method of claim 5, wherein the new virtual channel conforms to a Fibre Channel.

7. A system comprising a plurality of storage devices;

a plurality of storage providers, each storage provider including a fabric and a portion of the plurality of storage devices; and a plurality of host computers including a first host computer and a second host computer, each host computer running a virtual IO server and one or more client virtual machines, including a first virtual machine, the virtual IO server being responsive to a storage connectivity group (SCG) running on one host computer of the plurality of host computers, the fabric of each storage provider being connected to one or more host computers of the plurality of host computers, wherein the SCG is configured to attach a storage volume to the first virtual machine by:

determining from the plurality of storage providers that an attachment of the storage volume to the first virtual machine is possible by interrogating the plurality of storage providers and finding at least one fabric that is common connected to both the first host computer and the second host computer in the plurality of host computers;

upon determining that migration of the first virtual machine is permitted, migrating the first virtual machine to the second host computer to allow the attachment of the storage volume to the migrated first virtual machine; and attaching the storage volume to the migrated first virtual machine.

8. The system of claim 7, wherein the fabric of each storage provider includes a plurality of ports; and wherein determining that the attachment of the storage volume to the second host computer is possible is based on the plurality of ports of each storage provider.

9. The system of claim 7, wherein the SCG is further configured to, upon determining that migration of the first virtual machine is not permitted, send an indication to a user interface that the storage volume cannot be attached to the first virtual machine.

10. The system of claim 7, wherein the storage volume is attachable as a virtual SCSI (vSCSI) volume; and wherein the SCG is further configured to determine that the second host computer connects to the fabric of one of the plurality of storage providers that can accept the vSCSI volume.

11. The system of claim 7, wherein the storage volume is attachable as a virtualized N_Port ID (NPIV) volume;

wherein the SCG is further configured to, prior to migrating the first virtual machine to the second host computer, determine that the second host computer connects to the fabric of one of the plurality of storage providers that can accept the NPIV volume, and allocate a new virtual channel mapped to the fabric of the storage provider that accepts the NPIV volume; and wherein attaching the storage volume to the second host computer includes attaching the storage volume to the new virtual channel.

12. The system of claim 11, wherein the new virtual channel conforms to a Fibre Channel.

13. A computer program product for attaching a storage volume to a virtual machine, the computer program product comprising:

a computer-readable storage medium having computer-readable program code embodied therewith, the computer-readable program code executable by one or more computer processors to:

determine from a plurality of storage providers that an attachment of the storage volume to the virtual machine is possible, wherein each storage provider includes a fabric and a portion of a plurality of storage devices connected to the fabric, the fabric of each storage provider being connected to one or more host computers of a plurality of host computers;

wherein determining that an attachment of the storage volume to the virtual machine is possible comprises interrogating the plurality of storage provides and finding at least one fabric that is connected to both a first host computer and a second host computer in the plurality of host computers;

upon determining that migration of the virtual machine is permitted, migrate the virtual machine from the first host computer on which the virtual machine is running to the second host computer to allow the attachment of the storage volume to the virtual machine; and attach the storage volume to the migrated virtual machine.

14. The computer program product of claim 13,
wherein the fabric of each storage provider includes a plurality of ports; and
wherein the computer-readable program code executes to determine that the attachment of the storage volume to one host computer of a plurality of host computers is possible based on the plurality of ports of each storage provider.

15. The computer program product of claim 13, wherein, upon determining that migration of the virtual machine is not permitted, the computer-readable code is further executable to send an indication to a user interface that the storage volume cannot be attached to the virtual machine.

16. The computer program product of claim 14,
wherein the storage volume is attachable as a virtualized SCSI (vSCSI) volume; and
wherein the computer-readable code is further executable to determine that the second host computer connects to the fabric of one of the plurality of storage providers that can accept the vSCSI volume.

17. The computer program product of claim 14,
wherein the storage volume is attachable as a virtualized N_Port ID (NPIV) volume;
wherein the computer-readable program code is further executable to, prior to migrating the virtual machine to the second host computer, determine that the second host computer connects to the fabric of one of the plurality of storage providers that can accept the NPIV volume, and allocate a new virtual channel mapped to the fabric that can accept the NPIV volume; and
wherein the computer-readable program code that is executable to attach the storage volume to the second host computer includes being executable to attach the storage volume to the new virtual channel.

18. The computer program product of claim 17, wherein the new virtual channel conforms to a Fibre Channel.

* * * * *